United States Patent [19]

Hill

[11] 4,259,277

[45] Mar. 31, 1981

[54] METHOD AND APPARATUS FOR THE INJECTION OF ADDITIVES INTO PLASTICS MATERIAL

[75] Inventor: Alan H. Hill, Bury, England

[73] Assignee: The General Engineering Company (Radcliffe) Limited, Manchester, England

[21] Appl. No.: 951,832

[22] Filed: Oct. 16, 1978

[30] Foreign Application Priority Data

May 18, 1978 [GB] United Kingdom ............... 20382/78

[51] Int. Cl.² ............................. B29F 3/12; B32B 3/00
[52] U.S. Cl. ...................................... 264/75; 264/174; 264/211; 425/97; 425/130; 425/197; 425/462; 425/376 B
[58] Field of Search ..................... 204/176 F, 75, 211, 204/349, 174; 425/130, 97, 462, 464

[56] References Cited

U.S. PATENT DOCUMENTS

| | | | |
|---|---|---|---|
| 2,174,779 | 10/1939 | Delorme | 264/75 |
| 2,479,261 | 8/1949 | Reetz | 264/75 |
| 2,573,050 | 10/1951 | Orsini | 264/75 |
| 2,805,465 | 9/1957 | Miller | 264/75 |
| 2,815,033 | 12/1957 | Braunlich | 264/75 |
| 3,272,901 | 9/1966 | Sims | 264/75 |
| 3,706,825 | 12/1972 | Hall et al. | 264/75 |
| 3,726,955 | 4/1973 | Hughes et al. | 264/468 |
| 3,920,366 | 11/1975 | Randall | 264/175 |
| 3,930,782 | 1/1976 | Bigland | 425/461 |
| 4,128,386 | 12/1978 | Wissinger et al. | 264/171 |

FOREIGN PATENT DOCUMENTS

| | | | |
|---|---|---|---|
| 44-890 | 1/1969 | Japan | 425/131.1 |
| 51-47747 | 12/1976 | Japan | 264/75 |
| 970285 | 9/1964 | United Kingdom | 264/176 F |

*Primary Examiner*—Jay H. Woo
*Attorney, Agent, or Firm*—Fleit & Jacobson

[57] ABSTRACT

This invention provides a method and apparatus for injecting an additive into a stream of homogenized plastics material. The apparatus includes a homogenizing means such as a screw conveyor for the plastics material and at least one injector for injecting an additive, usually a colorant, into the boundary layer only of the homogenized plastics material prior to the latter being subjected to mastication in a gear pump. The additive is injected into the plastics material at such a position in the boundary layer that as the material passes through the gear pump the additive is mixed substantially wholly with the boundary layer of plastics material and for this purpose the injection of additive is at a position such that it passes through the gear pump in the region of the intermeshing gears of the pump.

16 Claims, 3 Drawing Figures

METHOD AND APPARATUS FOR THE INJECTION OF ADDITIVES INTO PLASTICS MATERIAL

This invention concerns a method and apparatus for the injection of additives into plastics materials and more particularly though not exclusively the injection of colouring pigments into plastics materials.

We have described in our co-pending applications numbered 35035/77 dated Aug. 20th 1977 and 45697/77 dated Nov. 3rd 1977 for the grant of Letters Patent, methods and apparatuses by means of which plastics material nodifying agents may be added to plastics materials during the production thereof.

Thus in application No. 35035/77 we have disclosed a method of simultaneously producing from a single source of basic plastics material, a product or series of products including different forms of plastics material which includes the steps of feeding a basic plastics material through a screw extruder, dividing the stream of homogenised plastics material issuing from the extruder into a plurality of separate streams, injecting a predetermined quantity of a liquid additive incorporating a plastics material modifying agent into at least one stream of basic plastics material, metering the various streams of plastics material and dispersing the modifying agent or agents through their respective stream or streams of basic plastics material and feeding the various streams of plastics material to extruded product forming means. The method aforesaid can be carried out using an apparatus including a screw extruder for homogenising a basic plastics material, a means for feeding the homogenised material to a manifold to produce a plurality of individual streams, an additive injection means for feeding a predetermined quantity of liquid modifying agent into at least one stream of basic plastics material, means for controlling the flow of modified plastics material and dispersing the modifying agent therethrough, and extruded product forming means for the plastics material.

In our application No. 45697/77 we have described a method of injecting a liquid additive incorporating a plastics material modifying agent into a stream of basic plastics material which includes the steps of at least partially dividing a stream of basic plastics material by means of a device used for the injection of the modifying agent, injecting the modifying agent into the partially divided stream of the basic plastics material thus to cause initial dispersive mixing of the basic plastics material and the modifying agent and thereafter subjecting the dispersively mixed mass to shearing action in a homogenising device further to disperse the modifying agent in the basic plastics material. This method of dispersively mixing a modifying agent in a basic plastics material can be carried out using an apparatus which includes a modifying agent dispersing means positioned in a basic plastics material supply line, the dispersing means including a device for at least partially dividing a single stream of basic plastics material for the reception of the modifying agent and means in the supply line for further dispersing the modifying agent in the basic plastics material.

In both of the applications aforesaid it has been a primary object of the invention to ensure that the modifying agent is dispersed as fully as possible throughout the basic plastics material stream into which it is injected thereby to produce a stream of modified plastics material which is as nearly constant as possible throughout its whole mass insofar as its modifying agent content is concerned.

It is well known that in the production of insulated electrical conductors colour coding is used and that, as a result of this there is a demand for multi-coloured insulation, for example, insulated earth wires are coloured yellow and green. Such a wire can be produced using the methods and the apparatuses disclosed in our applications aforesaid, and by other methods and apparatuses but in all cases it has been thought essential to first produce two separate streams of plastics material, one coloured yellow and the other coloured green. These two streams are then, for example, fed to a die head in separate streams for extrusion onto the conductor wire in such manner either that one stream first completely encircles the conductor and the other stream is laid, in the form of a stripe onto the coating previously applied or the die head is constructed so that part only of the periphery of the conductor is coated with each colour of plastics material. Thus for producing the coloured plastics material a complex die head is used and is connected to two supply lines, again each line has its own ancilliary apparatus for producing the coloured plastics material.

The present invention is based upon the appreciation that, by injecting an additive or additives into a basic plastics material in such a manner that, prior to mastication in a single gear pump, the additive or additives is, or are maintained in discrete regions of the basic plastics material.

It is one object of the present invention to provide a method of injecting at least one additive into a basic plastics material in a manner such that in a final extruded product the major portion at least of the additive will be contained in a part only of the final product.

A further object of the invention is to provide a method of injecting two or more additives into a basic plastics material, each additive being generally contained in a part only of the final product. More particularly an object of the invention is to provide a method of injecting colouring materials into a basic plastics material to produce a final extruded product in which there is at least one external coloured strip extending lengthwise of the extrusion.

A still further object of the invention is to provide an apparatus in which at least one additive can be injected into a basic plastics material and in which the additive during further processing of the plastics material is generally retained in a part only of the total mass of basic plastics material.

Thus according to one aspect of the present invention the method of injecting at least one additive into a stream of homogenised basic plastics material includes the steps of passing the basic plastics material from a homogenising means (such as a screw extruder) to an additive injection device, injecting at least one additive into the basic plastics material by means of an injector which extends into the basic plastics material in a manner such that a boundary layer thereof which, in use, is disposed to pass through a gear pump at an end region of the gears thereof, is divided to receive the additive, passing the basic plastics material to the gear pump to disperse the additive in the said boundary layer and passing the material from the gear pump to a final product extruding means.

According to a further aspect of the present invention apparatus for carrying out the method aforesaid includes an additive injection device having a housing provided with a passage through which homogenised basic plastics material can pass, at least one additive supply duct in the housing and a hollow probe extending into the passage from the duct to terminate a short distance from the passage wall and thus, in use, in a boundary layer region of the basic plastics material and a gear pump for masticating the basic plastics material said gear pump serving to disperse the additive primarily in a boundary layer region thereof which corresponds to that into which, in use, the additive is injected.

Preferably there is a plurality of spaced-apart supply ducts in the housing, each one being provided with a hollow probe extending into the passage for the basic plastics material, the said passage being divided into a number of sub-passages into each of which extends only one probe.

Preferably the additive injecting device is provided with at least two spaced-apart injectors and a means for maintaining the additives in separated condition, each injector serving to divide a boundary layer of the basic plastics material to receive the additive, the gear pump serving to disperse each of the additives in the boundary layer in the region in which it was divided to receive the additive and thereafter passing the plastics material from the gear pump to a final product extruding means. Conveniently the means for maintaining the additives in a separated condition is in the form of a divider extending from the injection region for the additives to the entry region of the gear pump.

The invention will now be described further, by way of example only, with reference to the accompanying part-sectional diagrammatic illustrations in which various additive injection device and masticating means are illustrated.

Figure 1:
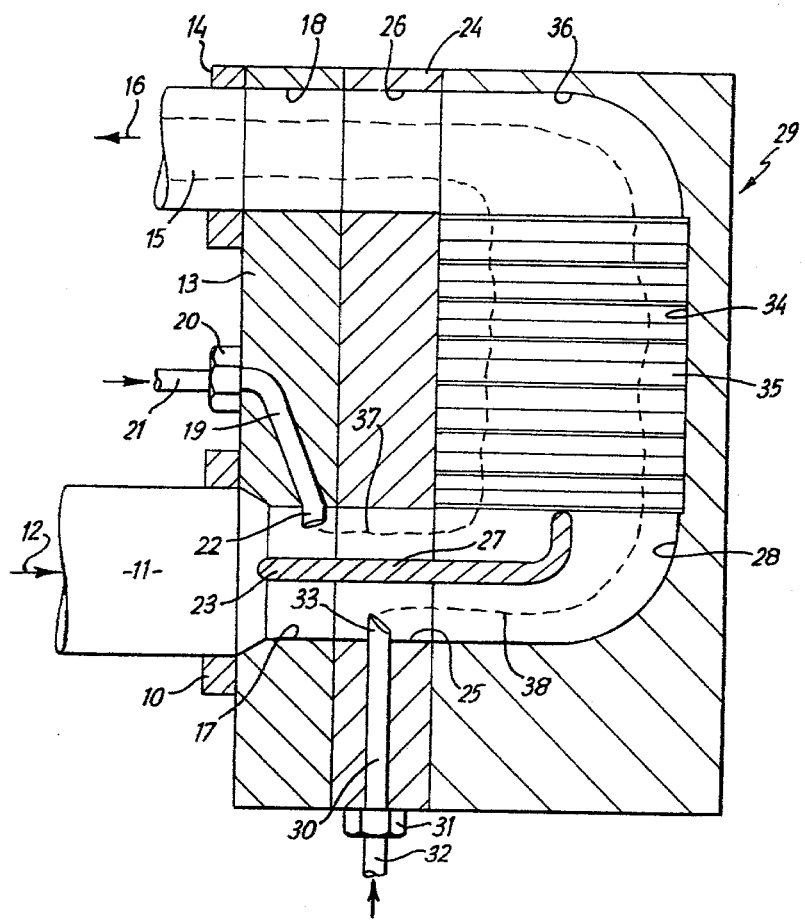
FIG. 1 shows one form of device.

Thus as shown in FIG. 1 of the drawings there is provided an apparatus which includes a connector 10 for a supply conduit 11 through which basic plastics materials flows in the direction of arrow 12 from a homogenising apparatus (such as a screw extruder) not shown. The connector 10 is mounted upon a first plate-like element 13 of an injector device. The element 13 is also provided with a connector 14, spaced from the connector 10, to which is secured a delivery conduit 15 from which basic plastics material including additive flows in the direction of arrow 16 to a die head (not shown) from which will issue a final extruded product. In the apparatus being described the final product is assumed to be an insulated electrical conductor in which the insulation is to be colour coded green and yellow. Clearly the apparatus can be used for the manufacture of articles other than that just referred to. The element 13 is bored, as at 17 to provide an inlet aperture and at 18 to provide an outlet aperture and in addition there is provided a bore 19 for a first additive. In this example it will be assumed that the first additive is a green liquid colouring pigment. There is provided a connector 20 at the outer end of the bore 19 for a supply pipe 21 for the pigment. At the inner end of the bore 19 there is provided a hollow probe 22 which extends for a short distance into the inlet aperture 17 of the element 13. The aperture 17 is provided with a division 23 which serves to divide it into two separate passageways through each of which, in use, will flow the basic plastics material.

Secured to the element 13 is a second plate-like element 24 which is bored at 25 to provide an aperture which is aligned with the aperture 17 of the element 13. A bore providing aperture 26 is also formed in the element 24 and this is aligned with the aperture, 18, of the element 13. The aperture 25 is provided with a division 27 which mates with the division 23 of aperture 17 and which extends into an inlet space 28 of a gear pump 29 referred to below. Also provided in the element 24 is a bore 30 which has at its outer end a connector 31 for a supply pipe 32 for a second additive, in this case a yellow liquid colouring pigment. At the inner end of the bore 30 is provided a hollow probe 33 which extends for a short distance into the aperture 25 of the element 24.

As can be seen from the illustration the probe 22 lies at one side of the division consisting of dividers 23 and 27 and the probe 33 lies at the other side of the division.

The gear pump 29 referred to above includes a receiving space 34 for a pair of meshing gears 35 (one only of which can be seen) which fit closely into the receiving space 34. The inlet space 28 of the gear pump 29 lies at one side of the receiving space 34 for the gears 35 and opposite to the inlet space 28 is an outlet space 36 which is aligned with the aperture 26 of the element 24.

In operation a homogenised mass of basic plastics material of neutral colour is fed into the injector device through supply conduit 11 and as it flows through aperture 17 of the first element 13 it is divided into two streams by divider 23. Green pigment is injected into one of the streams via bore 19 and probe 22 the latter serving to divide the boundary layer of the plastics material to provide a space into which the pigment can flow. The divided stream of basic plastics material now passes through aperture 25 of the second element 24 and yellow pigment is injected via bore 30 and probe 33 into the boundary layer of the stream of plastics material at the opposite side of the division to that which contains the green pigment. The probe 33 serves to divide the boundary layer of plastics material in the same manner as the probe 22. The broken lines 37 and 38 indicate generally the locations in the stream of plastics material of the green and yellow pigments respectively. It is to be understood that the broken lines 37 and 38 are not intended to indicate with precision the locations of the pigments since there will be some dispersion thereof around the surfaces of the plastics material which are in contact with the walls of the apertures 17, 25 and the inlet space 28 of the gear pump 29. The broken lines thus show generally the regions in which the pigments are most concentrated. As the plastics material passes between the gears 35 of the gear pump 29 the mass is masticated and the colouring pigments are mixed and somewhat dispersed in the basic plastics material and although there will be some migration of the pigments into the central region of the now recombined streams of plastics material the major proportion of the pigments will remain in the boundary layer thereof and thus when the stream of plastics material emerges from the aperture 18 to pass through the die head the extruded product will have clearly discernible strips of yellow and green on its surface since passage through the die head does not cause any further mixing to take place.

The invention is not restricted to the details set out above. For example there may be more than two probes in the injection device, in which case there will conveniently be an additional plate like member for each additional probe, and, conveniently, there will be a sufficient number of divisions in the injecting device as are required to enable each probe to enter into one sub-stream only of the basic plastics material.

In some instances the division can be omitted and it is envisaged that, providing the additive is injected into the basic plastics material in such manner that the plastics material itself retains the additive in a confined region thereof passage of the plastics material through the gear pump will not result in the additive being dispersed throughout the whole mass of the plastics. Thus by injecting two or more additives in the vicinity of the entry into the gear pump, and by ensuring that there is an undivided layer of plastics material between each injected stream of additive the material exiting from the gear pump will be capable of being passed through a final product forming die in such manner that, assuming the additives to be colourants, the final product will be longitudinally striped.

If desired there may be provided a division or divisions in the outlet region of the gear pump and/or in the delivery conduit. In the latter case the division or divisions may extend to the entry region of the final product forming means.

Figure 2:
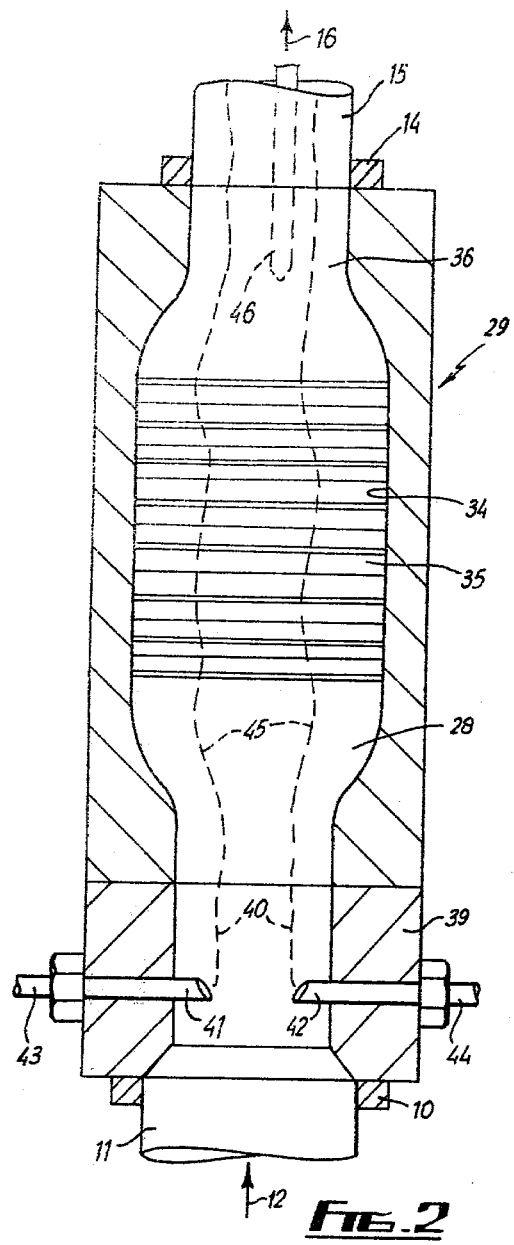
FIG. 2 shows a first modification.

FIG. 2 shows a modification of the apparatus of FIG. 1 in which the plastics material itself retains the additive in a confined region such that as the basic plastics material and additive passes through the gear pump 29 the additive will be located principally in those parts of the stream of basic plastics material which lie in the end regions of the gears 35. In this particular arrangement there is provided a plate-like member 39 attached to the gear pump 29 in such position that a bore 40 in the member 39 is aligned with the inlet space 28 of the gear pump 29. In the particular apparatus being described there are provided two diametrically opposed probes 41 and 42 which terminate just within the bore 40 of the member 39, thus the ends of the probes are spaced-apart by an appreciable distance. Supply lines 43 and 44 for additive are connected to the member 39 to communicate respectively with the probes 41 and 42. The broken lines 45 indicate generally the inner extremities of the regions in which the major part of the additives are confined during passage through the gears 35 of the gear pump 29. The optional division referred to above is also illustrated and as can be seen this division 46 is located in the outlet space 36 of the gear pump 29 and the delivery conduit 15.

Figure 3:
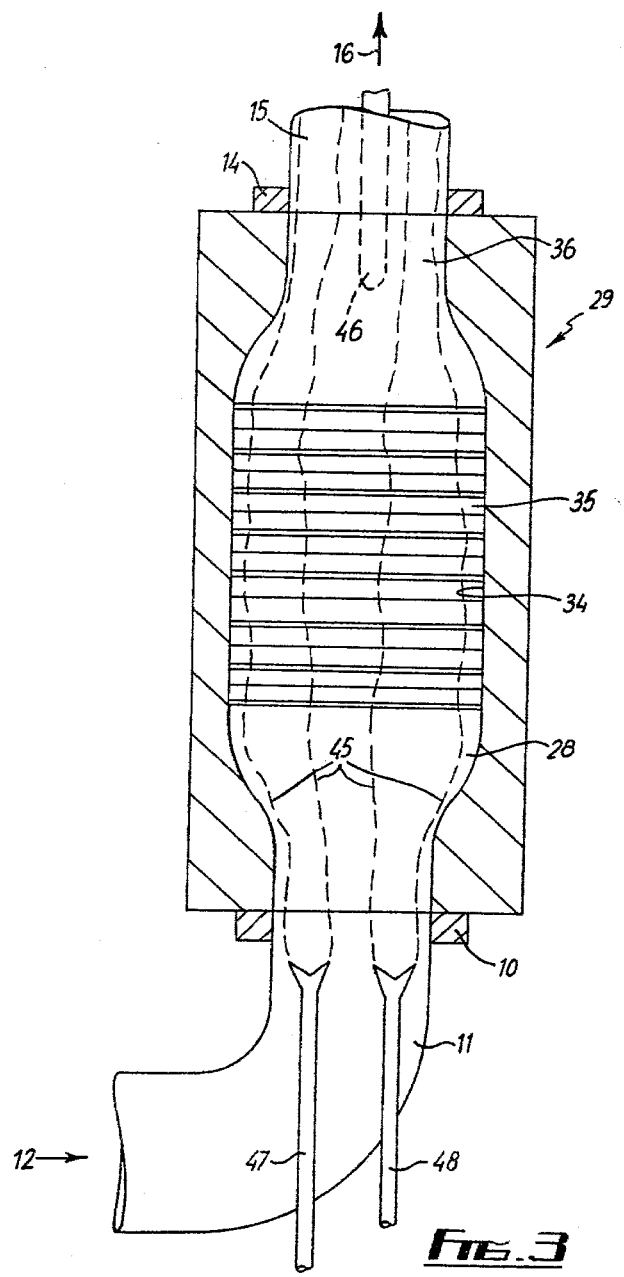
FIG. 3 shows a second modification. Like parts in the various figures of the drawings are indicated by identical reference numerals.

Turning now to FIG. 3 there is shown an apparatus in which, in contradistinction to FIG. 2 there is no plate-like element 39.

In this case the supply conduit 11 for basic plastics material is turned through 90° adjacent its connector 10 and two probes 47 and 48 are located within the bore of the conduit 10 in spaced-apart disposition relative to each other and also spaced from that part of the conduit wall which lies in alignment with the inlet space 28 of the gear pump 29. Conveniently the free ends of the probes are fish tailed as shown at 49 and the additives thus tend to spread along the free edges of the fish tails and generally follow the paths indicated by the broken lines 45 as they pass through the gears 35 of the gear pump 29.

As in the arrangement of FIG. 2 there may be provided a division 46 in the outlet space 36 of the gear pump and the delivery conduit 15.

In the apparatuses illustrated in FIGS. 2 and 3 the basic plastics material itself serves to maintain the additives in separated streams and the need for a division of the kind shown at 27 in FIG. 1 is obviated.

What we claim is:

1. A method of injecting at least one additive into a stream of homogenized basic plastics material comprising the steps of passing the homogenized mass of basic plastics material to an additive injection site, injecting at least one liquid additive into part at least of a boundary layer of the basic plastics material, passing the stream of plastics material to a gear pump means such that the part of the boundary layer into which the additive has been injected enters the spaces between the teeth of the gears of the gear pump means at least at one end region thereof, dispersing the additive in the boundary layer of the basic plastics material such that substantially all of the additive remains in the boundary layer only, and passing the basic plastics material, with the additive therein, to a final product extruding means.

2. A method for supplying a die head means for extruding a basic plastics material around an electrical conductor so as to form an insulated electrical conductor having an external coloration around the insulation and extending lengthwise of the insulation, wherein said method comprises the steps of forwarding the homogenized mass of basic plastics material in a stream to an injection site, injecting at least one additive in the form of a liquid colorant having a color different from that of the basic plastics material, into a boundary layer only of the plastics material stream, forwarding the stream of basic plastics material to the entry of a gear pump, with the said boundary layer so disposed as to enter spaces between the teeth of the gears of the gear pump at at least one end region only of the spaces between said teeth, masticating the basic plastics material in the gear pump to disperse the liquid additive substantially wholly within the boundary layer thereby to produce a consistently colored boundary layer and forwarding the plastics material stream to a die head means for extrusion of the stream around an electrical conductor.

3. An additive injection device for injecting at least one additive into the boundary layer of a stream of basic plastics material, wherein substantially all of the additive remains in the boundary layer, comprising a gear pump having a housing having a cavity containing at least one pair of intermeshing gears, an inlet to the cavity and an outlet from the cavity and at least one injector means for the additive located at the inlet, said injector means being so positioned as to enable additive to be injected into a boundary layer only of a basic plastics material during its passage to the gear pump in such position as to cause the additive to enter the spaces between the teeth of the gears in an end region only thereof.

4. An additive injection device as claimed in claim 3 in which each said injector means is in the form of a hollow probe having one end extending into the inlet to the gear pump housing for injecting an additive into the inlet adjacent its wall thereby to inject the additive into a boundary layer only of basic plastics material during its passage to the gear pump.

5. An additive injection device as claimed in claim 3 in which there are two injector means at the inlet to the gear pump.

6. An additive injection device as claimed in claim 5 in which there are two injector means, each in the form of a hollow probe, extending into the inlet to the gear pump.

7. Apparatus as claimed in claim 4 further comprising two spaced apart additive supply means at the inlet to the housing, each one being provided with a hollow probe means extending into an inlet passage for the basic plastics material, said passage being divided to provide two sub-passages into each of which extends only one hollow probe means.

8. Apparatus as claimed in claim 3 in which the inlet to the housing is divided by a divider which extends from the injection means to the cavity containing a pair of meshing gears.

9. Apparatus as claimed in claim 3 in which the axes of the inlet and the outlet of the housing are arranged in parallelism and at right angles to the flow axis of the plastics material in the gear pump means.

10. Apparatus as claimed in claim 3 in which the gear pump housing is provided with at least one plate-like element having spaced apart inlet and outlet apertures therein, the inlet and outlet apertures communicating with the cavity containing the meshing gears to provide an inlet and an outlet respectively for the gear pump.

11. Apparatus as claimed in claim 10 in which the plate-like element is provided with an additive injector means at the inlet aperture.

12. Apparatus as claimed in claim 10 in which the gear pump housing is provided with at least two plate-like elements each having spaced apart inlet and outlet apertures therein, the inlet apertures each being provided with an additive injector means.

13. Apparatus as claimed in claim 3 in which the outlet form the housing is provided with a divider extending from the cavity containing the pair of meshing gears.

14. Apparatus as claimed in claim 3 in which the axes of the inlet and the outlet of the housing are aligned and arranged in parallelism with the flow axis of the plastics material in the gear pump means.

15. Apparatus as claimed in claim 14 in which the inlet to and outlet from the housing are each provided with a divider extending to the cavity containing the pair of meshing gears.

16. Apparatus as claimed in claim 3 further comprising a die head connected to the outlet of said cavity, and means for supplying an electrical conductor in position such that the plastics material can be extruded around said electrical conductor when the plastics material is extruded through said die head.

* * * * *